May 5, 1970  R. D. SMITH  3,510,206
TRANSPARENT MIRROR HAVING ELECTROMAGNETICALLY
ADJUSTABLE REFLECTOR ELEMENTS
Filed March 7, 1966
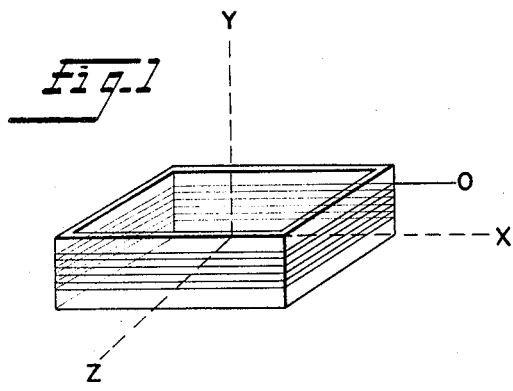
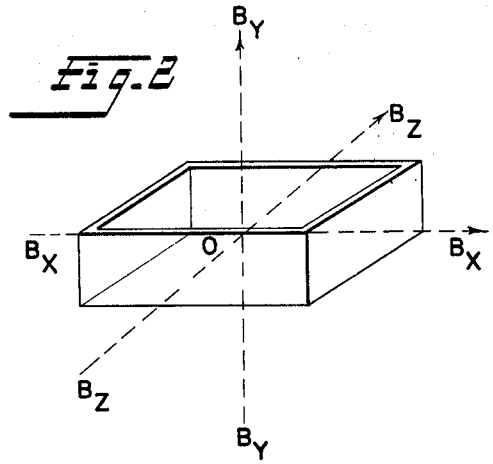
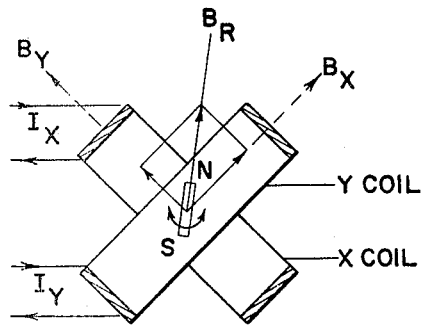
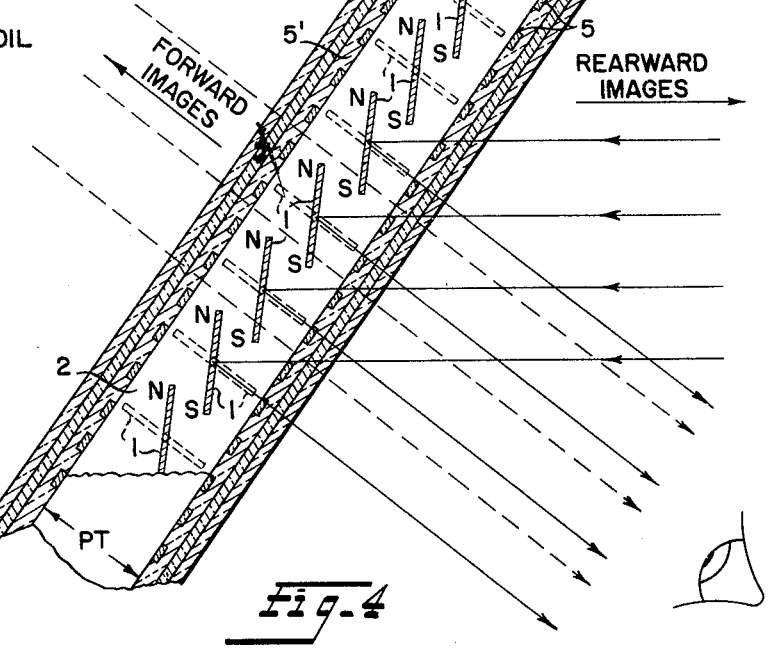
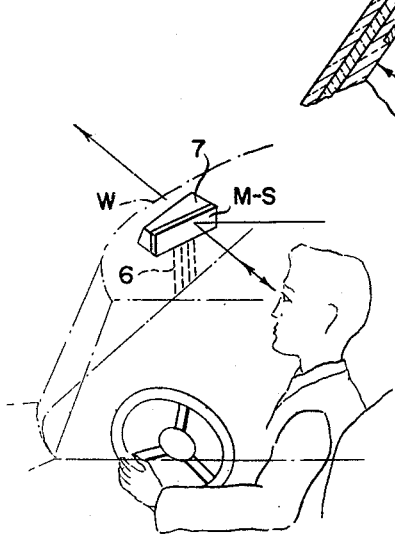
INVENTOR
RICHARD D. SMITH

3,510,206
**TRANSPARENT MIRROR HAVING ELECTRO-
MAGNETICALLY ADJUSTABLE REFLECTOR
ELEMENTS**
Richard D. Smith, 913 N. Liberty St.,
Arlington, Va. 22205
Filed Mar. 7, 1966, Ser. No. 532,300
Int. Cl. G02b 5/08
U.S. Cl. 350—292                    3 Claims

ABSTRACT OF THE DISCLOSURE

A shutter-like mirror structure contains a plurality of cross-sectionally thin permanent magnet reflector elements supported in substantially parallel relationship by a transparent, elastic, self-supporting material. The sponge-like material, containing the reflector elements, is surrounded by sets of transparent electric coils which can be selectively energized to produce a magnetic field that aligns the magnetic reflector elements to transmit light or to function as a mirror.

---

The subject invention relates generally to an electrically adjustable mirror and shutter structure characterized by a movement which can be controlled in three-dimensions from a remote position. The subject device is particularly useful in connection with automobiles and the like wherein a rear-viewing function is desired or required, the more notable advantages of the subject invention over similar devices presently employed being as follows: the subject device can be quickly attached to or detached from an automobile or the like windshield for ease of replacement purposes; it is readily adjustable in Venetian blind fashion through a near infinite number of rearwardly-viewing positions while functioning as a mirror; it is readily movable through a further position whereupon it becomes substantially transparent when viewed from a predetermined line-of-sight; it is comprised almost entirely of component parts which are flexible and therefore compressible to an extent when impacted to thereby provide an element of safety in the event of accidental collisions; and it is readily amendable to mass productiona techniques.

In order that the invention may be clearly understood, reference is made to the following description taken in conjunction with the appended drawings wherein:

FIGS. 1 to 3 are schematic illustrations useful in promoting understanding as to the operation of the subject device;

FIG. 4 shows a sectional side view of the subject optical structure with portions removed to distinguish the various component parts, the dotted line N–S elements illustrating their normal shutter-open position under the condition of no intentionally applied electric field forces so as to reflect images to an observer which images originate rearwardly of his position;

FIG. 5 is a perspective view of a single N–S element; and

FIG. 6 is a perspective view of the subject device in place on the interior surface of an automobile windshield.

The optical structure of this invention to be described in more detail hereinafter operates in accord with the well known principles of vector force summation. As shown schematically in FIG. 1, the electrical energization of three coils (of which only one is shown for the sake of clarity) positioned about the respective axes of a three orthogonal axis coordinate system X, Y, Z is characterized by the generation of respective force field components $B_x$, $B_y$, $B_z$ generally in line with the respective axes as shown in FIG. 2. While the force field vectors of FIG. 2 have been assigned prescribed directions as denoted by the arrowheads, and magnitudes as denoted by the lengths from the origin O to the arrowhead tips, a reversal in the direction of current flow and variation as to the amperage thereof in a given coil is all that is required to modify, respectively, the direction and magnitude of the force field established by that coil.

With reference to FIG. 3 which shows only two of the three coils being considered, again for the sake of clarity, it is readily seen that the individual force field components are resolvable into a single resultant force field vector $B_r$. By a judicious selection of coil design and by the use in conjunction therewith of suitable current control circuitry which permits selective control of the current values supplied to the individual coils (e.g. $I_x$ and $I_y$), the resultant field $B_r$, may be confined to a substantially planar pattern which is selectively positionable in three dimensions. If now a relatively sturdy bar-type permanent magnet characterized by north and south poles N–S is somewhow freely suspended interiorly of the three orthogonal coil configuration as schematically shown in FIG. 3, the magnet will tend to align itself with the resultant force field component and thereby itself be adjustably positionable in three dimensions. The optical structure of this invention relates to just such an arrangement.

Reference is now made to FIG. 4 which shows the preferred embodiment of the optical structure constructed in accord with the teachings of this invention. A plurality of long, thin, although physically sturdy, and rectangular-shaped permanent magnet N–S elements 1 are shown as being embedded in an elastic and self-supporting dielectric material 2 which is also characterized by a high degree of optical transparency. The N–S elements are configured as shown in FIG. 5 and are physically supported and/or suspended in substantially parallel relationship by material 2 under the condition of no intentionally applied force fields, the long dimension of the elements being perpendicular to the plane of the drawing as viewed in FIG. 4. The width dimension of the N–S elements is less than the primary thickness PT of material 2 and the other related dimensions are selected such that normal movement of the elements within material 2 is restricted to a volume of space which is remote from the external surface boundaries of the material. The permanent magnet elements suspended as described are thus free to move in three dimensional space. Any one or combination of the following tends to effectively prevent the opposite poles of any two adjacent magnetic elements from permanently sticking together which would render all or a portion of the subject device inoperative as described: the physical distance separating the elements; the constraining effects on the elements by their elastic supporting means; the strong effects of the intentionally applied force fields.

The surfaces of the N–S elements which face in the direction of the "Rearward Images" arrow are highly polished, or alternatively, polished and coated with a very thin metalic coating; in any event, and by any other known practical techniques, the N–S elements are caused to function as mirrors whereby radiation incident on the referenced surfaces as indicated in FIG. 4 by the solid line parallel rays is substantially 100% reflected.

Movement of the N–S elements within the elastic material 2 in accordance with this invention is by way of three orthogonally oriented coil configurations selectively and variably energized under the control of any known manually variable coil current control means (not shown) essentially as above described. FIG. 4 shows portions only of such coils 3, 4, 5. The coils are positioned about the mirror element supporting material 2 as shown and are preferably of the printed circuit type in which electrically conducting material is sprayed or otherwise deposited upon a dielectric backing sheet as is well known, the backing sheets integrally associated with coils 3, 4, 5 being respectively indicated by 3', 4', 5'. In accordance with this invention both the coils and their associated backing sheets are optically transparent; materials of this type are commonly employed in the electroluminescent display art and as such do not form a part of the subject invention. Although FIG. 4 shows each coil as comprising but a single layer of conducting paths, as many layers may be employed as are necessary to the generation of the required force fields.

In addition to their mirror element moving function, the printed coils in conjunction with their respective dielectric backing sheets serve as an enclosure for the elastic material 2 to thereby confine the same to a predeterminable volume and prevent the intrusion of foreign matter which might tend to reduce the optical transparency characteristic of the subject device. Inasmuch as coil configurations of the nature disclosed are equivalent electrical antenna structures and therefore susceptable to external electromagnetic effects, electrical shielding means (not shown) may be employed as necessary; shielding means of the referenced type are well known.

The dielectric material used to support the mirror elements is very critical to the successful performance of the subject optical structure. As mentioned previously, the material must be characterized by a high degree of optical transparency and must further be elastic and self-supporting, somewhat on the order of spong rubber. Among the known materials which exhibit the required characteristics are various methacrylate polymers and high polymers of chlorotrifluoroethylene. Reference is here made to the Vinyl and Related Polymers text authored by Calvin E. Schildknecht, especially pages 230, 231 and 478 to 483, for a more detailed description of these and related materials. The use of similarly characterized materials other than those mentioned is of course well within the scope of this invention.

FIG. 6 shows the optical structure of this invention being utilized in an automobile as a substitute for the conventionally employed manually adjustable rear-view mirror. Attachment of the optical structure to the windshield W is preferably by way of any known transparent adhesive capable of establishing a bond which is not readily broken by environmental forces normally acting thereon. The means used for connecting the various coils to the power supply and the selective coil current control circuitry forms no part of this invention and is therefore not shown; in this regard however, note that transparent electrical connecting leads as schematically shown at 6 in FIG. 6 are preferably employed when traversals of the windshield cannot be avoided. Given the proper fabricating materials, an obvious extension of the disclosed optical structure would be that of including the same as an integral part of the windshield W.

An innovation especially useful when the subject optical structure is employed as an automobile rear-view mirror as above is that of using a separate (as shown) or integral generally wedge-shaped element characterized by a trapezoidal cross-section and limited flexibility, the element being positioned intermediate the optical structure M–S and the windshield as schematically shown in FIG. 6 by the numeral 7. The dimensions of these optically transparent elements 7 are correlated to the angle subtended by the windshield relative to the horizontal and by the angles subtended by the operator's mirror viewing line-of-sight relative to the vertical, the vertical, and the azimuth, the correlation being such as to enable a pre-positioning of the optical structure whereby same is approximately in line with the most satisfactory rear viewing position of the aptical structure for any given operator. By use of the described innovation, the electric field force affected adjustments of the elastically suspended reflecting elements necessary to a fine positioning thereof may be minimized with the consequent saving in both electrical and operator energy expenditures.

Having thus described my invention, and taking cognizance of the fact that the term—electric force field—as used in this specification is intended to encompass both magnetic field systems as specifically disclosed and the substantially equivalent and analogous electrostatic systems, I claim:

1. A shutter like structure selectively operable as a mirror or as a substantially transparent device when viewed from a perdetermined line-of-sight, said structure comprising: a plurality of cross-sectionally thin permanent magnet reflector elements, a self-supporting and transparent elastic dielectric medium normally suspending said elements in substantially parallel relationship, a plurality of optically transparent electrical coils wrapped about and confining said medium and said elements, and means to selectively energize said coils to produce a magnetic field for selectively moving said elements about at least two orthogonal axes.

2. A structure as in claim 1 wherein said plurality of electrical coils number three for enabling selective movement of said elements about three orthogonal axes.

3. A structure as in claim 2 wherein said coils are of the printed circuit type.

References Cited

UNITED STATES PATENTS

| 2,945,182 | 7/1960 | Montgomery | 324—97 X |
| 1,229,420 | 6/1917 | Dixon | 350—285 |
| 2,532,876 | 12/1950 | Asche et al. | 335—230 |
| 3,131,250 | 4/1964 | Ely | 350—303 |
| 3,257,903 | 6/1966 | Marks | 350—290 X |
| 3,280,701 | 10/1966 | Donnelly et al. | 350—288 X |

FOREIGN PATENTS 489,442   7/1938   Great Britain.

DAVID SCHONBERG, Primary Examiner

J. W. LEONARD, Assistant Examiner

U.S. Cl. X.R.

350—172, 266, 285, 288